US012698078B2

(12) United States Patent (10) Patent No.: US 12,698,078 B2
Artic et al. (45) Date of Patent: Aug. 4, 2026

(54) FLIGHT CONTROL SYSTEM WITH HAPTIC FEEDBACK AND ASSOCIATED SYSTEMS AND METHODS

(71) Applicant: The Boeing Company, Arlington, VA (US)

(72) Inventors: Daniel Artic, Biebesheim (DE); Lars Fucke, Frankfurt (DE)

(73) Assignee: The Boeing Company, Arlington, VA (US)

( * ) Notice: Subject to any disclaimer, the term of this patent is extended or adjusted under 35 U.S.C. 154(b) by 610 days.

(21) Appl. No.: 18/178,040

(22) Filed: Mar. 3, 2023

(65) Prior Publication Data

US 2024/0294247 A1 Sep. 5, 2024

(51) Int. Cl.
| | |
|---|---|
| *G05B 5/00* | (2006.01) |
| *B64C 13/04* | (2006.01) |
| *B64C 13/10* | (2006.01) |
| *B64C 13/50* | (2006.01) |
| *G06F 3/01* | (2006.01) |
| *H02H 7/08* | (2006.01) |

(52) U.S. Cl.
CPC .......... *B64C 13/0421* (2018.01); *B64C 13/10* (2013.01); *B64C 13/507* (2018.01); *G06F 3/016* (2013.01)

(58) Field of Classification Search
CPC ... B64C 13/0421; B64C 13/507; B64C 13/10; G06F 3/016
USPC ........................................................ 318/470
See application file for complete search history.

(56) References Cited

U.S. PATENT DOCUMENTS

| | | | | |
|---|---|---|---|---|
| 7,701,161 | B2 * | 4/2010 | Hanlon | B64C 13/345 |
| | | | | 318/568.1 |
| 11,669,987 | B2 * | 6/2023 | Zhao | G05D 1/106 |
| | | | | 382/103 |
| 2007/0007385 | A1 * | 1/2007 | Potter | B64C 13/505 |
| | | | | 244/53 R |
| 2007/0145180 | A1 * | 6/2007 | Johnson | B64C 13/50 |
| | | | | 244/13 |
| 2008/0142642 | A1 * | 6/2008 | Marino | B64C 13/507 |
| | | | | 244/223 |
| 2022/0283602 | A1 * | 9/2022 | Battlogg | F16H 59/02 |

* cited by examiner

*Primary Examiner* — Erick D Glass
(74) *Attorney, Agent, or Firm* — Massey Bean & Lewis

(57) ABSTRACT

A flight control system includes a user input apparatus configured to receive a flight change input from a user via a manual manipulation of a position of the user input apparatus. A sensor is coupled to the user input apparatus and configured to determine a change in the position of the user input apparatus. The sensor is also configured to generate position data. A feedback controller is configured to selectively receive the position data and further configured to generate a feedback-control signal when a commanded attitude, corresponding to the change in the position of the user input apparatus is equal to a predetermined threshold. A haptic feedback device is coupled to the user input apparatus and configured to receive the feedback-control signal and, in response to receiving the feedback-control signal, generate haptic feedback motion of the user input apparatus.

20 Claims, 6 Drawing Sheets

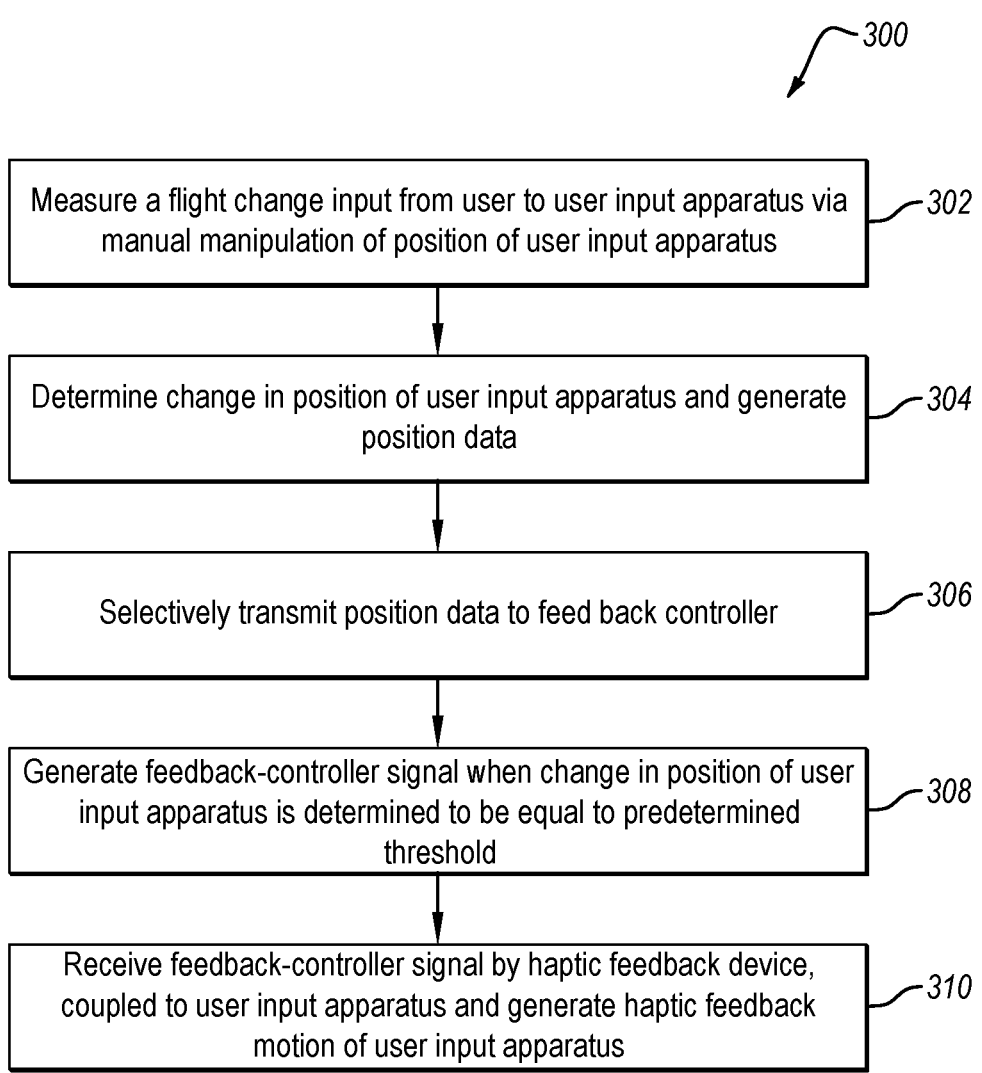

~300

Measure a flight change input from user to user input apparatus via manual manipulation of position of user input apparatus — 302

Determine change in position of user input apparatus and generate position data — 304

Selectively transmit position data to feed back controller — 306

Generate feedback-controller signal when change in position of user input apparatus is determined to be equal to predetermined threshold — 308

Receive feedback-controller signal by haptic feedback device, coupled to user input apparatus and generate haptic feedback motion of user input apparatus — 310

FIG. 6

FLIGHT CONTROL SYSTEM WITH HAPTIC FEEDBACK AND ASSOCIATED SYSTEMS AND METHODS

FIELD

This disclosure relates generally to a flight control system for an aircraft, and more particularly to a flight control system with haptic feedback and associated methods.

BACKGROUND

An aircraft has a variety of flight control surfaces that control its movement, such as elevators, rudders and ailerons. These flight control surfaces are typically controlled by a flight control surface actuation system, which is operated by a flight crew (e.g., pilot or co-pilot) when flying manually, or an autopilot. While flying manually, the flight crew gives flight commands, via at least one user input apparatus, to adjust the flight control surface actuation system. Typically, there is no direct feedback provided either to the user input apparatus or associated displays that informs the flight crew of a current ordered flight command as the user input apparatus is manually moved. The delay between the ordered flight command and the aircraft attaining the ordered flight command can be significant, especially with large airplanes. Accordingly, the flight crew, being unaware of the current ordered flight command, can cause the flight crew to overcontrol the aircraft. Overcontrolling the aircraft can cause unintended pilot-induced oscillations to the aircraft.

SUMMARY

The subject matter of the present application has been developed in response to the present state of the art, and in particular, in response to the problems of and needs created or not yet fully solved by conventional user input apparatuses and methods. Generally, the subject matter of the present application has been developed to provide a flight control system, with haptic feedback and associated systems and methods, that overcomes at least some of the above-discussed shortcomings of prior art techniques.

Disclosed herein is a flight control system. The flight control system comprises a user input apparatus configured to receive a flight change input from a user via a manual manipulation of a position of the user input apparatus. The flight control system also comprises a sensor coupled to the user input apparatus and configured to determine a change in the position of the user input apparatus, due to the manual manipulation of the position of the user input apparatus. The sensor is also configured to generate position data, including the change in the position of the user input apparatus. The flight control system further comprises a feedback controller configured to selectively receive the position data. The feedback controller is further configured to generate a feedback-control signal when a commanded attitude, corresponding to the change in the position of the user input apparatus is equal to a predetermined threshold. The flight control system additionally comprises a haptic feedback device coupled to the user input apparatus, configured to receive the feedback-control signal, and, in response to receiving the feedback-control signal, generate haptic feedback motion of the user input apparatus. The preceding subject matter of this paragraph characterizes example 1 of the present disclosure.

The haptic feedback device is a vibration-inducing device. Additionally, the haptic feedback motion comprises a vibration, wherein a duration and an intensity of the vibration is such that the haptic feedback motion does not create a change in the position of the user input apparatus. The preceding subject matter of this paragraph characterizes example 2 of the present disclosure, wherein example 2 also includes the subject matter according to example 1, above.

The change in the position of the user input apparatus corresponds with a change in at least one of: a bank angle of an aircraft, a pitch angle of the aircraft, a roll angle of the aircraft, a flight path angle of the aircraft, an airspeed of the aircraft, a heading of the aircraft, a vertical reference path of the aircraft, or a horizontal reference path of the aircraft. The preceding subject matter of this paragraph characterizes example 3 of the present disclosure, wherein example 3 also includes the subject matter according to any of examples 1-2, above.

The user input apparatus comprises at least one aircraft control side-stick. The preceding subject matter of this paragraph characterizes example 4 of the present disclosure, wherein example 4 also includes the subject matter according to any of examples 1-3, above.

The haptic feedback motion is generated in real-time, such that the haptic feedback motion is generated by the haptic feedback device immediately after the feedback-control signal is received from the feedback controller. The preceding subject matter of this paragraph characterizes example 5 of the present disclosure, wherein example 5 also includes the subject matter according to any of examples 1-4, above.

The flight control system further comprises a flight controller configured to generate flight control surface signals in response to the position data. The flight control system is selectively switchable between operation in a first mode and operation in a second mode. When the flight control system is operating in the first mode, the position data is received by the feedback controller, and the position data is further transmitted to the flight controller. When the flight control system is operating in the second mode, the position data is received directly by the flight controller, such that the feedback controller is bypassed. The preceding subject matter of this paragraph characterizes example 6 of the present disclosure, wherein example 6 also includes the subject matter according to any of examples 1-5, above.

When the flight control system is operating in the second mode, the feedback-control signal is not generated. The preceding subject matter of this paragraph characterizes example 7 of the present disclosure, wherein example 7 also includes the subject matter according to example 6, above.

The flight control system comprises two or more user input apparatuses. The haptic feedback motion is received in each one of the two or more user input apparatuses. The preceding subject matter of this paragraph characterizes example 8 of the present disclosure, wherein example 8 also includes the subject matter according to any of examples 1-7, above.

The flight control system comprises a second user input apparatus configured to receive a second flight change input from a second user via a manual manipulation of a position of the second user input apparatus. The flight control system also comprises a second sensor coupled to the second user input apparatus and configured to determine the change in the position of the second user input apparatus, due to the manual manipulation of the position of the second user input apparatus. The second sensor further configured to generate second position data, including the change in the position of the second user input apparatus. The feedback controller is configured to selectively receive the second position data and further configured to generate a second feedback-controller signal when the commanded attitude, corresponding to the change in the position of the second user input apparatus is equal a predetermined threshold. The flight control system further comprises a second haptic feedback device coupled to the second user input apparatus, configured to receive the second feedback-controller signal and, in response to the receiving the second feedback-controller signal, generate second haptic feedback motion of the second user input apparatus. The preceding subject matter of this paragraph characterizes example 9 of the present disclosure, wherein example 9 also includes the subject matter according to any of examples 1-8, above.

The feedback controller is configured to determine an average change of the position of the user input apparatus and the position of the second user input apparatus. The feedback controller generates the feedback-controller signal and the second feedback-controller signal when the average change of the position of the user input apparatus and the position of the second user input apparatus is equal to the predetermined threshold. The preceding subject matter of this paragraph characterizes example 10 of the present disclosure, wherein example 10 also includes the subject matter according to example 9, above.

The feedback controller is configured to selectively generate a plurality of feedback-control signals. Each one of the plurality of feedback-control signals corresponds with one of a plurality of predetermined thresholds. The feedback controller generates one of the plurality of feedback-control signals when the change in the position of the user input apparatus is equal to the corresponding predetermined threshold. The preceding subject matter of this paragraph characterizes example 11 of the present disclosure, wherein example 11 also includes the subject matter according to any of examples 1-10, above.

The plurality of predetermined thresholds are positioned at regular intervals, such that the change in the position of the user input apparatus between each one of the plurality of predetermined thresholds is equal. The preceding subject matter of this paragraph characterizes example 12 of the present disclosure, wherein example 12 also includes the subject matter according to example 11, above.

At least one of a duration or an intensity of the haptic feedback motion has a variable magnitude. At least one of the duration or the intensity of the haptic feedback motion is different based on the difference between a sensed position of the user input apparatus and the predetermined threshold. The preceding subject matter of this paragraph characterizes example 13 of the present disclosure, wherein example 13 also includes the subject matter according to any of examples 1-12, above.

Further disclosed herein is a control apparatus for controlling flight of an aircraft. The controller apparatus comprises a processor. The controller apparatus further comprises non-transitory computer readable storage media storing code, the code being executable by the processor to perform operations comprising determining a change in a position of a user input apparatus, due to a manual manipulation of the position of the user input apparatus and generating position data, including the change in the position of the user input apparatus. The code also being executable by the processor to perform operations comprising selectively transmitting the position data to a feedback controller and a flight controller. The code also being executable by the processor to perform operations comprising generating a feedback-control signal, via the feedback controller, in response to receiving the position data, when the change in the position of the user input apparatus is equal to or greater than a predetermined threshold and transmitting the feedback-control signal to a feedback device coupled to the user input apparatus. The code further being executable by the processor to perform operations comprising generating flight control surface signals, via the flight controller, in response to receiving the position data. In response to receiving the feedback-control signal, the feedback device generates a haptic feedback motion of the user input apparatus. The preceding subject matter of this paragraph characterizes example 14 of the present disclosure.

The controller apparatus further comprises selectively switching control of the flight of the aircraft between a first mode and a second mode. When control of the flight of the aircraft is in the first mode, transmitting the position data to the feedback controller and further transmitting the position data to the flight controller. When control of the flight of the aircraft is in the second mode, transmitting the position data directly to the flight controller, such that the feedback controller is bypassed. The preceding subject matter of this paragraph characterizes example 15 of the present disclosure, wherein example 15 also includes the subject matter according to example 14, above.

When control of the flight of the aircraft is in the second mode, the feedback-control signal is not generated. The preceding subject matter of this paragraph characterizes example 16 of the present disclosure, wherein example 16 also includes the subject matter according to example 15, above.

The feedback controller is configured to generate a plurality of feedback-control signals. Each one of the plurality of feedback-control signals corresponds with one of a plurality of predetermined thresholds. The feedback controller generates one of the plurality of feedback-control signals when the change in the position of the user input apparatus is equal to or greater than the corresponding predetermined threshold. The preceding subject matter of this paragraph characterizes example 17 of the present disclosure, wherein example 17 also includes the subject matter according to any of examples 14-16, above.

Further disclosed herein is a method of controlling flight of an aircraft. The method comprises measuring a flight change input from a user via a manual manipulation of a position of a user input apparatus. The method also comprises determining a change in the position of the user input apparatus, due to the manual manipulation of the position of the user input apparatus, and generating position data, including the change in the position of the user input apparatus. The method further comprises selectively transmitting the position data to a feedback controller. The method additionally comprises generating, via the feedback controller, a feedback-control signal when a commanded attitude, corresponding to the change in the position of the user input apparatus is determined to be equal to a predetermined threshold. The method also comprises receiving the feedback-control signal by a haptic feedback device coupled to the user input apparatus and, in response to receiving the feedback-control signal, generating haptic feedback motion of the user input apparatus. The preceding subject matter of this paragraph characterizes example 18 of the present disclosure.

The method further comprises selectively switching control of the flight of the aircraft between a first mode and a second mode. When control of the flight of the aircraft is in the first mode, transmitting the position data to the feedback controller. When control of the flight of the aircraft is in the second mode, transmitting the position data to a flight controller and the flight controller generating flight control surface signals in response to the position data, such that the feedback controller is bypassed. The preceding subject matter of this paragraph characterizes example 19 of the present disclosure, wherein example 19 also includes the subject matter according to example 18, above.

The user input apparatus comprises two or more user input apparatuses. The step of generating the haptic feedback motion of the user input apparatus comprises generating the haptic feedback motion in each one of the two or more user input apparatuses. The preceding subject matter of this paragraph characterizes example 20 of the present disclosure, wherein example 20 also includes the subject matter according to any of examples 18-19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which:

FIG. 6 is a schematic flow diagram of a method of controlling the flight of an aircraft, according to one of more examples of the present disclosure.

DETAILED DESCRIPTION

Reference throughout this specification to "one example," "an example," or similar language means that a particular feature, structure, or characteristic described in connection with the example is included in at least one example of the subject matter of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the subject matter of the present disclosure, however, absent an express correlation to indicate otherwise, an implementation may be associated with one or more examples.

Disclosed herein are examples of a flight control system haptic feedback and associated systems and methods. The flight control system includes at least one user input apparatus configured to be operated by a flight crew, such as a pilot or co-pilot (i.e., user) to control a flight control surface actuation system and/or thrust of an aircraft. When the user input apparatus is manually manipulated by the user, the appropriate flight control surface actuators are actuated to adjust the corresponding flight control surface and/or the thrust of the aircraft is modulated to control the speed of the aircraft. Typically, however, the user, while actively manipulating the user input apparatus, is not aware of the current ordered flight command (i.e., command attitude). Additionally, the delay between user ordered flight commands and the time it takes for the aircraft to reach the ordered flight command can be significant, especially with large aircraft. This can cause the user to making additional manual manipulations to the user input apparatus and lead to over-controlling the flight path of the aircraft. Overcontrolling the aircraft through addition manual manipulations to the user input apparatus results in user-induced flight oscillations to the aircraft, such as when the user inadvertently commands an often-increasing series of corrections in opposite directions, each an attempt to cover the aircraft's reaction to the previous input with an overcorrection in the opposite direction. Therefore, haptic feedback is employed and provided directly from the user input apparatus, yielding effective, intuitive, and real-time feedback of the current ordered flight command to the user. Accordingly, a haptic feedback device is configured to generate haptic feedback motion of the user input apparatus when the user input apparatus has a change to the position that is equal to a predetermined threshold.

Figure 1:
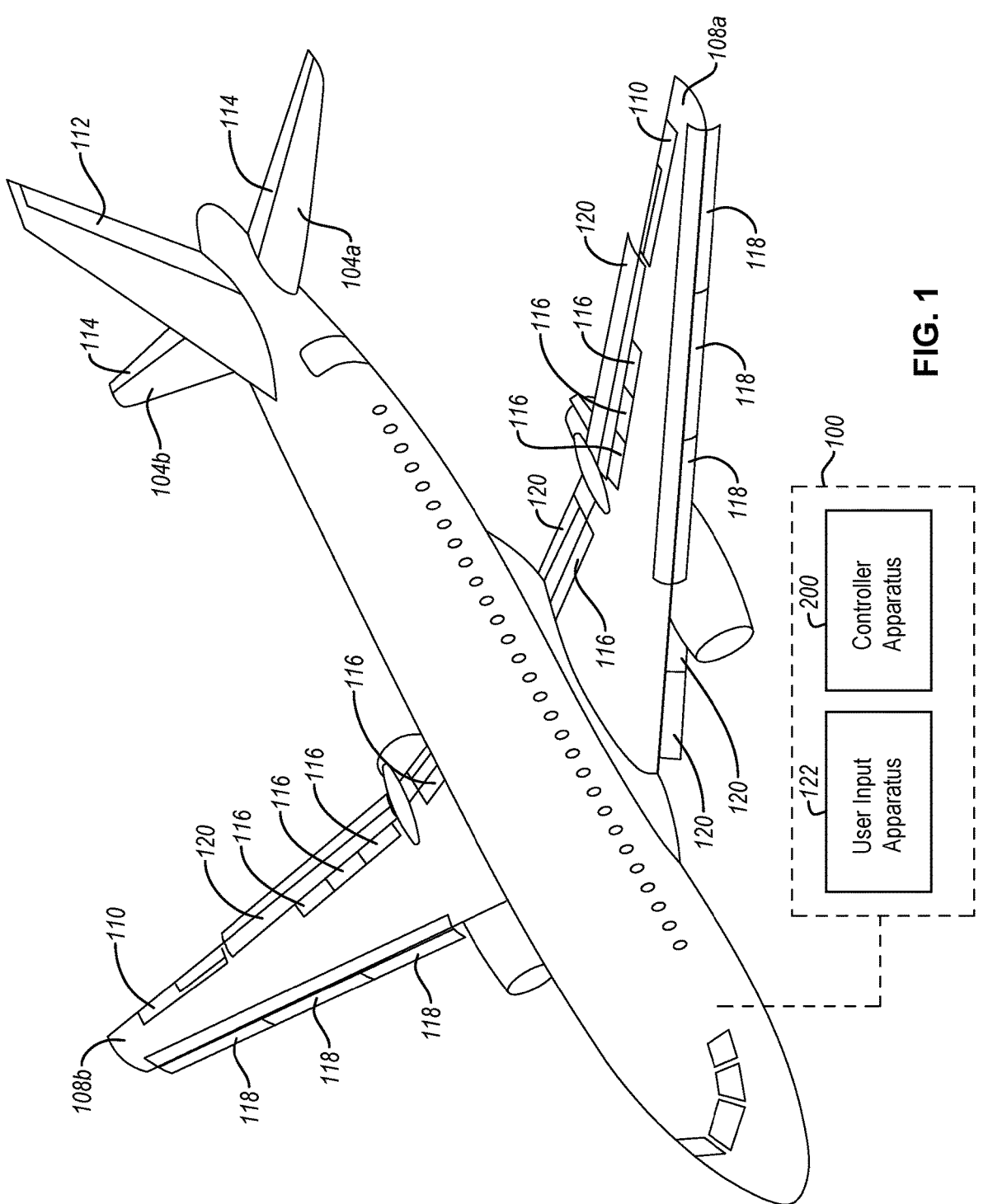
FIG. 1 is a schematic perspective view of an exemplary aircraft, with primary and secondary flight control surfaces, according to one or more examples of the present disclosure.

Referring to FIG. 1, a perspective view of an exemplary aircraft 102 is shown. In some examples, the aircraft 102 includes a fuselage with a first wing 108*a*, a second wing 108*b*, a first horizontal stabilizer 104*a*, a second horizontal stabilizer 104*b*, and a vertical stabilizer 106. The aircraft 102 includes primary flight control surfaces which are adjustable to control the rotational movement of the aircraft 102 about a roll axis, parallel to a longitudinal axis of the aircraft 102, a pitch axis, parallel to a lateral axis of the aircraft 102, and a yaw axis, parallel to a vertical axis of the aircraft 102. Typically, primary flight control surfaces include ailerons 110, elevators 114 and rudders 112. Specifically, the ailerons 110 are used to control rotational movement about the roll axis of the aircraft 102, the elevators 114 are used to control rotational movement about the pitch axis of the aircraft 102, and the rudder 112 is used to control rotational movement about the yaw axis of the aircraft 102. As shown, the first horizontal stabilizer 104a and the second horizontal stabilizer 104b each include at least one elevator 114, a rudder 112 is disposed on the vertical stabilizer 106, and a plurality of ailerons 110 are disposed on the first wing 108a and the second wing 108b. Additionally, in some examples, the aircraft 102 also includes secondary flight control surfaces which may include spoilers 116, slats 118, and flaps 120, located on the first wing 108a and the second wing 108b. The secondary flight control surfaces are used to affect the lift and drag of the aircraft 102.

Figure 2:
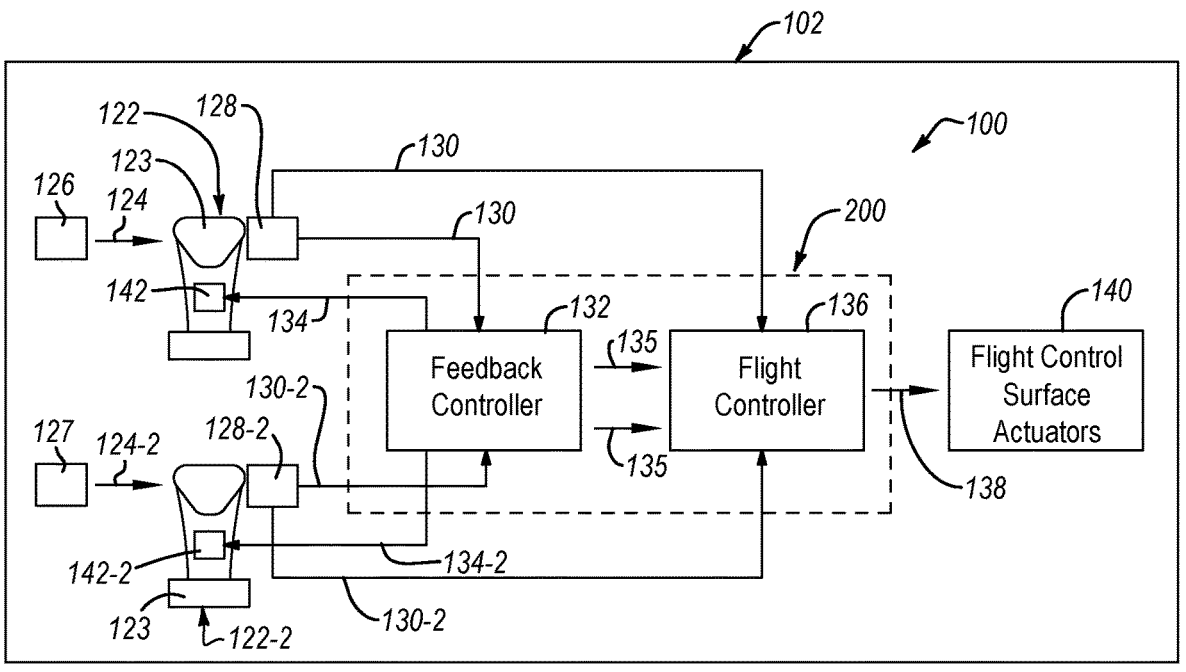
FIG. 2 is a schematic block diagram of a flight control system of an aircraft, according to one or more examples of the present disclosure.

The primary flight control surfaces (e.g., the ailerons 110, the rudder 112, the elevators 114) and the secondary flight control surfaces (e.g., the spoilers 116, the slats 118, the flaps 120) are adjustable by a plurality of flight control surface actuators 140 (see, e.g., FIG. 2). The flight control surface actuators 140 are actuatable to adjust a corresponding one of the primary flight control surfaces or a corresponding one of the secondary flight control surfaces. Although not shown, it will be appreciated that the flight control surface actuators 140 includes a plurality of actuators such as aileron actuators, coupled to at least one aileron, rudder actuators, coupled to at least one rudder, elevators actuators, coupled to at least one elevator, spoiler actuators, coupled to at least one spoiler, slat actuators, coupled to at least one slat, and flap actuators, coupled to at least one flap. At least one flight controller 136, included in the controller apparatus 200, is coupled to the flight control surface actuators 140 and configured to selectively actuate each one of the various flight control surface actuators 140. The flight controller 136 is configured to receive ordered flight commands from one or more user input apparatuses 122, receipt of which may be direct or indirect depending on a mode in which the aircraft is operating, as discussed below. In some examples, more than one flight controller 136 may be used, or the functionality of the flight controller 136 may be implemented using other devices. The aircraft 102 also includes a thrust generator, such as a jet engine, which can also be controlled by the flight controller 136, via input from the one or more user input apparatuses 122, to adjust the thrust generated by the thrust generator and thus adjust the speed of the aircraft 102.

The aircraft 102 includes a flight control system 100, which is configured to control the flight of the aircraft 102. The flight control system 100 includes at least one user input apparatus 122 coupled to a controller apparatus 200. The user input apparatus 122, or plurality of user input apparatuses 122 may be any device capable of receiving a flight change input 124, via the manual manipulation of a position of the user input apparatus 122. In other words, the user input apparatus 122 is configured to receive ordered flight commands from a user. The change in position of the user input apparatus 122, due to the manual manipulation of the position of the user input apparatus 122, and corresponding to a change in the flight command of the aircraft, is configured to be received by a controller apparatus 200 of the flight control system 100. The controller apparatus 200 generates flight control surface signals based on the change in position of the user input apparatus 122. In response to the flight control surface signals, power is supplied to the appropriate flight control surface actuators, to move the corresponding flight control surfaces to a position, and/or to the thrust generators, to generated a corresponding level of thrust, that will cause the aircraft 102 to execute the ordered command flight.

Referring to FIG. 2, one example of the flight control system 100 of the aircraft 102 is shown. The flight control system 100 may include one user input apparatus 122 or, in some examples, may include two user input apparatuses 122, such as a first user input apparatus 122, configured to receive a flight change input 124 from a user 126 (e.g., pilot), and a second user input apparatus 122-2, configured to receive a flight change input 124-2 from a second user 127 (e.g., co-pilot). In other examples, the flight control system 100 may have more than two user input apparatuses 122. Regardless of the amount of user input apparatuses 122, each user input apparatus is configured to receive a flight change input 124 from a user, such as the first user 126 via a manual manipulation of the position of the user input apparatus 122. The user input apparatus 122 may be any device that is capable of receiving the flight change input 124, such as an aircraft control side-stick 123, an aircraft control center stick, or an aircraft yoke (i.e., control column).

Each user input apparatus 122 is configured to move, when acted upon by a user applying a force to the user input apparatus 122, from a neutral position (e.g., position where no change in flight command is ordered) to a flight command position. Specifically, in some examples, the user 126 can control the movement of the aircraft 102 about the pitch axis by moving the user input apparatus 122 in a forward direction or an aft direction. The user 126 can also control the movement of the aircraft 102 about the roll axis by moving the user input apparatus 122 in a starboard direction or a port direction. Additionally, the user 126 can control the movement of the aircraft about a combination of the pitch axis and roll axis, such as a forward-starboard direction, forward-port direction, aft-starboard direction, aft-port direction, or back to a neutral position. A sensor 128 is coupled to the user input apparatus 122 and configured to determine (i.e., sense) a change in the position of the user input apparatus 122 due to the manual manipulation of the position of the user input apparatus 122 by the user 126 to the ordered flight command position. The sensor 128 may be any device capable of sensing the position of the user input apparatus 122. In some examples, the sensor 128 is a rotary variable differential transformer or a linear variable differential transformer. The flight control system 100 may include additional sensors that assist in determining the flight command position, such as a rate sensor or an attitude sensor. In other examples, the sensor 128 is a combination of sensors, such as a rate sensor and an attitude sensor. The sensor 128 generates position data 130, which includes at least the change in the position of the user input apparatus 122. The position data 130, in some cases, is supplied directly to a feedback controller 132.

The feedback controller 132 is configured to receive the position data 130 and, based on the received position data 130, is configured to selectively generate a feedback-control signal 134. That is, the feedback-control signal 134 is generated when a commanded attitude, corresponding to the change in the position of the user input apparatus 122 is equal to a predetermined threshold. As used herein a predetermined threshold refers to a set value that is used to determine when the required change in a position of the user input apparatus 122 has occurred. The commanded attitude may correspond to any change in the flight path of the aircraft 102, including a change to a bank angle of the aircraft, a change to a pitch angle of the aircraft, or a change to a roll angle of the aircraft. In some examples, the commanded attitude may also correspond to other changes in the aircraft 102 including, a change in airspeed of the aircraft, a change in a heading of the aircraft, a change in a vertical reference path of the aircraft, or a change in a horizontal reference path of the aircraft.

In some examples, the position data 130 is supplied directly to the flight controller 136, such that the feedback controller 132 is bypassed. The flight controller 136 is configured to receive the position data 130 and generate flight control surface signals 138 in response to the position data 130. The flight control surface signals 138 are supplied to the flight control surface actuators 140 to control the appropriate flight control surfaces. A determination of whether the position data 130 is supplied to the feedback controller 132 or the flight controller 136 is determined by a mode the aircraft 102 is operating within.

The flight control system 100 is selectively switchable between operation in a first mode and operation in a second mode. As used herein, selectively switchable means that a user, or the flight control system 100 itself, can change the flight control system from operating either in the first mode to the second mode, or operating in the second mode to the first mode. When the flight control system 100 is operating according to the first mode, the position data 130 is received by the feedback controller 132 and the feedback controller 132 further transmits the position data 130, included in a feedback-flight signal 135, to the flight controller 136. The flight controller 136 is configured to receive the feedback-flight signal 135 and generate flight control surface signals 138 in response to the feedback-flight signal 135. Additionally, when operating in the first mode, the feedback-control signal 134, selectively generated by the feedback controller 132, is generated when the predetermined threshold is met. In other words, when the aircraft is operating under the first mode, haptic feedback motion of the user input apparatus 122 may be selectively generated. In some examples, as described below in reference to FIG. 4, multiple feedback-control signals 134 may be selectively generated when a corresponding predetermined threshold is met. The first mode can be any of various modes of operation. For example, in some cases, flight operation in the first mode, refers to a flight control system 100 where flight computers transform the manual manipulations of the user input apparatus 122 into movements of the aircraft flight control surfaces. This example of a first mode operation, sometimes referred to as normal law, is designed to ensure that the aircraft's flight control surfaces respond in a predictable and normal manner to the flight change inputs 124 from the user input apparatus 122.

When the flight control system 100 is operating according to the second mode, the position data 130 is received directly by the flight controller 136. Accordingly, when the aircraft is operating in the second mode, the position data 130 is not received by the feedback controller 132 and no feedback-control signals 134 are generated. In other words, when the aircraft is operating under the second mode, haptic feedback motion of the user input apparatus 122 will not be generated. The lack of feedback control signals 134 when the change in the position of the user input apparatus is equal to the predetermined threshold indicates to the user 126 that the aircraft is operating in the second mode. The second mode can be any of various alternative modes of operation. For example, in some cases, flight operation in the second mode, refers to a flight control system where the manual manipulations of the user input apparatus 122 are directly linked to the movement of the flight control surface, with little or no intermediate computer or software, sometimes referred to as direct or alternative law. As a result, this second mode operation provides the user with a more direct and immediate response to user input apparatus 122, and the flight control surfaces respond in a more linear and predictable manner.

The controller apparatus 200 includes at least the feedback controller 132 and the flight controller 136. Specifically, the controller apparatus 200 includes a processor and non-transitory computer readable storage media storing code, the code being executable by the processor to perform the operations of the controller apparatus 200, which include, determining whether the flight control system 100 is operating under the first mode or the second mode.

A haptic feedback device 142 is coupled to the user input apparatus 122. The haptic feedback device 142 is configured to receive the feedback-control signal 134 from the feedback controller 132. Accordingly, the feedback-control signal 134 is only received by the haptic feedback device 142 when the aircraft is operating in the first mode. In response to receiving the feedback-control signal 134, the haptic feedback device 142 generates haptic feedback motion of the user input apparatus 122. In some examples, the haptic feedback device 142 is a vibration-inducing device, such as a vibration motor, linear actuator, or other device which can cause a vibration to the user input apparatus 122. Any haptic feedback motion, produced by the haptic feedback device 142 is of a duration, a frequency, and an intensity such that the haptic feedback motion does not create a change in the position of the user input apparatus 122. That is, the haptic feedback motion is strong enough to be perceived by the user 126 but not strong enough to cause additional movement to the user input apparatus 122. The haptic feedback motion is generated in real-time. That is, the haptic feedback motion is generated by the haptic feedback device 142 immediately upon receipt of the feedback-control signal 134. Real-time haptic feedback allows the user 126 to be aware of the current ordered flight command, and before the aircraft 102 is able to attain the ordered flight command.

In some examples, the flight control system 100 includes the second user input apparatus 122-2. The second user input apparatus 122-2 is configured to receive a second flight change input 124-2 from a second user 127 (e.g., co-pilot). A second sensor 128-2 is coupled to the second flight control apparatus 122-2 and configured to determine a change in the position of the second user input apparatus 122-2 and generate second position data 130-2. The second position data 130-2 is received by the feedback controller 132, when the aircraft is operating in the first mode, and further transmitted the position data 130, included in the feedback-flight signal 135 to the flight controller 136. Alternatively, the second position data 130-2 is received directly by the flight controller 136, when the aircraft is operating in the second mode. When operating in the first mode, the feedback controller 132 is configured to receive the second position data 130-2 and generate a second feedback-controller signal 134-2 when the commanded attitude, corresponding to the change in the position of the second user input apparatus 122-2 is equal to the predetermined threshold. A second haptic feedback device 142-2 is coupled to the second user input apparatus 122-2 and upon receipt of the second feedback-controller signal 134-2 generates second haptic feedback motion of the second user input apparatus 122-2. In some examples, the flight control system 100 includes more than one feedback controller 132 or more than one flight controller 136, such that the position data 130 and the second position data 130-2 is received by more than one feedback controller 132 or two separate feedback controllers 132. However, whether more than one feedback controller 132 is employed, the functionality is the same. Additionally, the controller apparatus 200 may include more than one feedback controller 132 and more than one flight controller 136.

In some examples, the feedback controller 132 is configured to determine an average change in the position of the user input apparatus 122 and the position of the second user input apparatus 122-2. That is, when both the user input apparatus 122 and the second user input apparatus 122-2 receive simultaneous flight change input 124 and second flight change input 124-2, respectively, the feedback controller 132 averages the two inputs. Accordingly, the feedback controller generates the feedback-controller signal 134 and the second feedback-controller signal 134-2 when the average change of the position of the user input apparatus 122 and the second user input apparatus 122-2 is equal to the predetermined threshold. The haptic feedback motion and the second haptic feedback motion will be generated simultaneously to the user input apparatus 122 and the second user input apparatus 122-2 when the predetermined threshold is met. In other examples, the feedback controller 132 calculates a cumulative value of the flight change input 124 and the second flight change input 124-2, such that the inputs are added together. Accordingly, the feedback controller generates the feedback-controller signal 134 and the second feedback-controller signal 134-2 when the cumulative change of the position of the user input apparatus 122 and the second user input apparatus 122-2 is equal to the predetermined threshold. The haptic feedback motion and the second haptic feedback motion will be generated simultaneously to the user input apparatus 122 and the second user input apparatus 122-2 when the predetermined threshold is met. In yet other examples, the position data 130 and the second position data 130-2 are relayed separately to the feedback controller 132, such that there is no averaging or cumulative effect of the position data. Accordingly, the feedback-control signal 134 and the associated predetermined threshold is based only on the position data 130, and the second feedback-control signal 134-2 and the associated predetermined threshold is based only on the second position data 130-2. The haptic feedback motion of the user input apparatus 122 is generated when the predetermined threshold is met and the second haptic feedback motion of the second user input apparatus 122-2 is generated separately when the predetermined threshold is met.

Figures 3A, 3B:
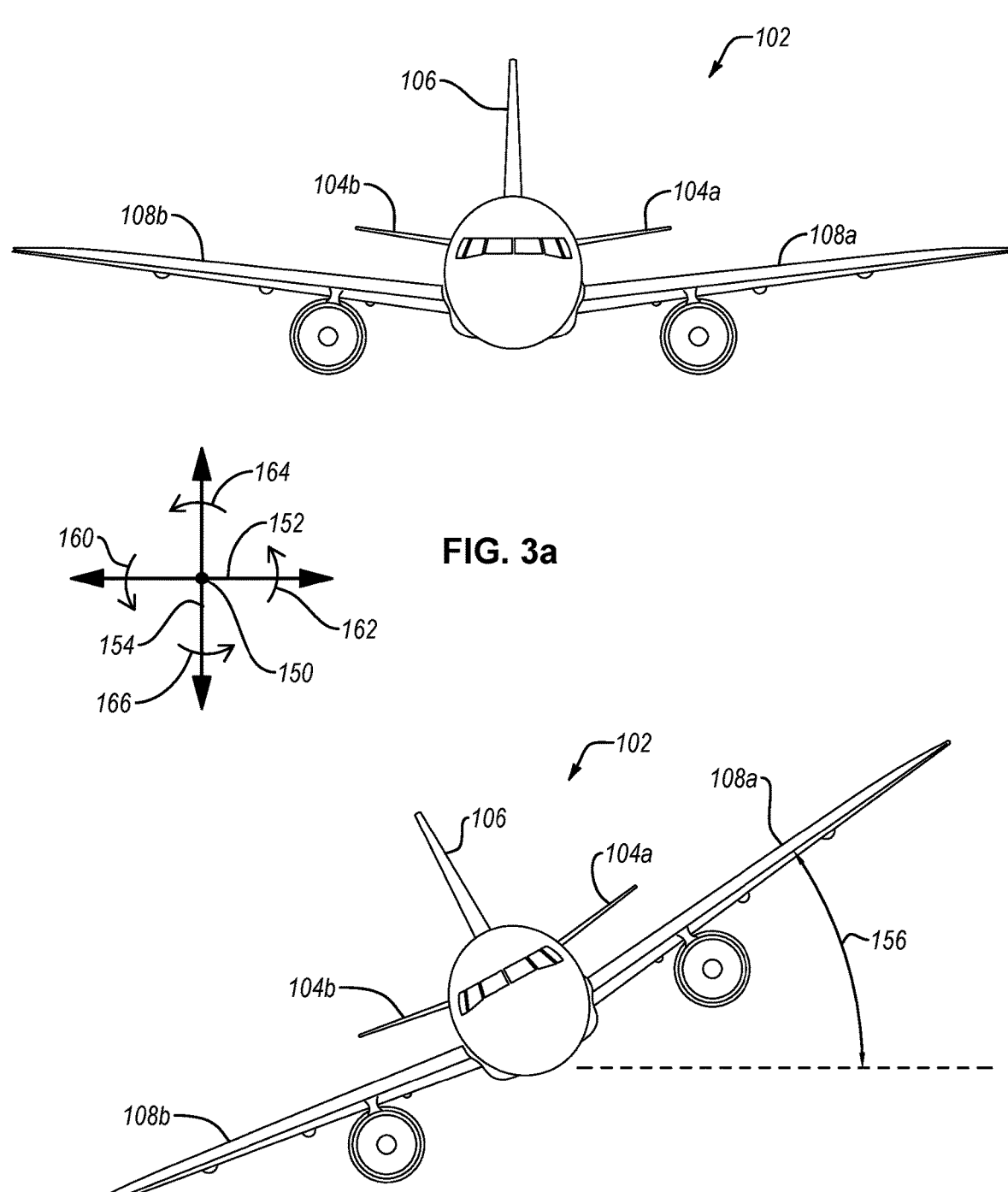
FIG. 3*a* is a schematic front view of an aircraft flying along a neutral flight path, according to one or more examples of the present disclosure.
FIG. 3*b* is a schematic front view of the aircraft of FIG. 3*a*, the aircraft rotated along a roll axis and at a roll angle relative to the horizon, according to one or more examples of the present disclosure.
Figure 4:
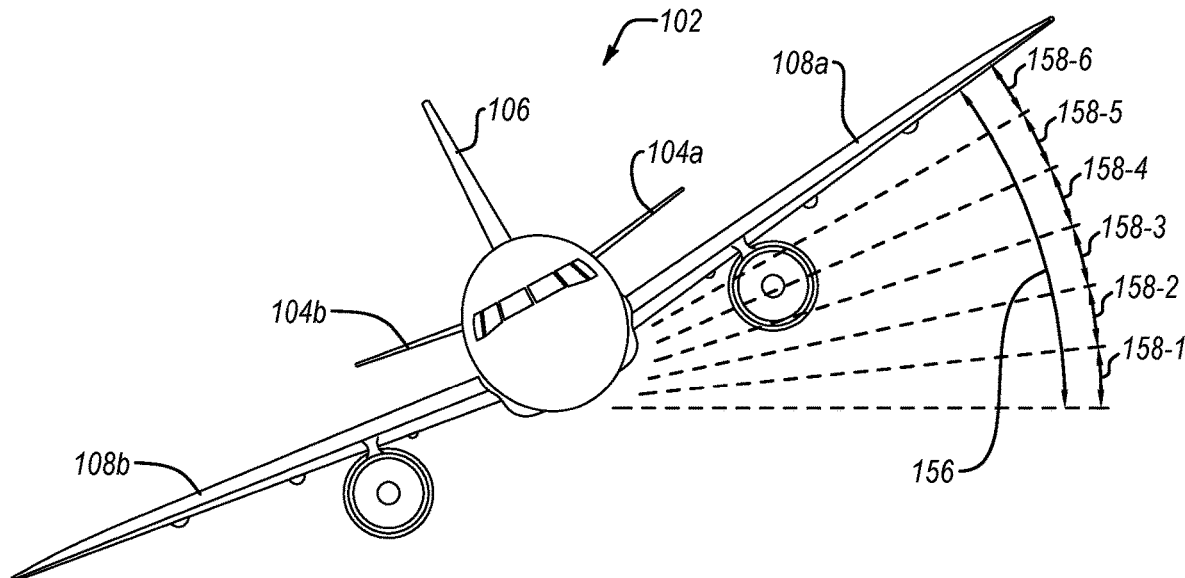
FIG. 4 is a schematic front view of the aircraft of FIG. 3*a*, the aircraft rotated along the roll axis and at a roll angle relative to the horizon, with multiple predetermined thresholds along the roll angle, according to one or more examples of the present disclosure.
Figure 5:
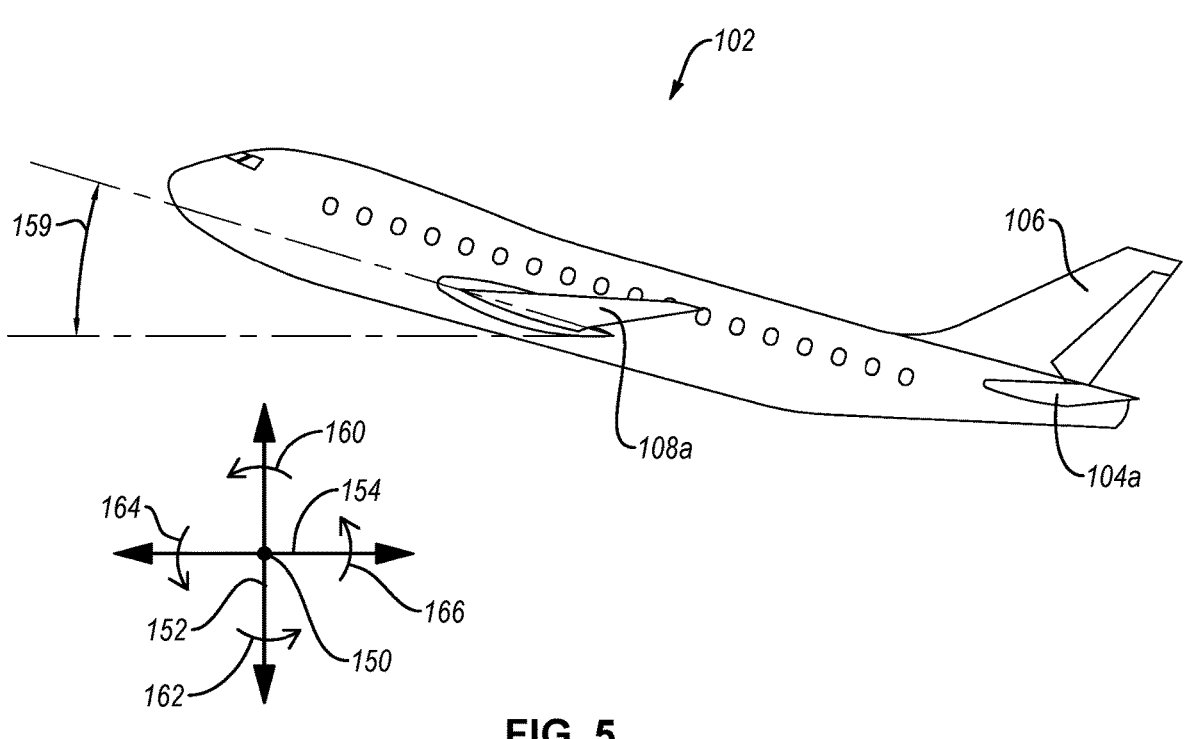
FIG. 5 is a schematic side view of an aircraft, the aircraft rotated about the pitch axis and at a pitch angle relative to the horizon, according to one or more examples of the present disclosure.

Referring to FIGS. 3-5, the implementation of the flight control system 100 will now be described. As shown in FIG. 3a, the aircraft 102 is in flight along a neutral flight path, such that a pitch angle of the aircraft, relative to the horizon, and a roll angle, relative to the horizon, are both zero and the aircraft 102 is parallel to the horizon. A flight change input to the user input apparatus 122 will change the flight path of the aircraft 102, and thus the commanded attitude of the aircraft 102. As described above, the aircraft 102 can rotate about two perpendicular rotational axes, a pitch axis 154 and a roll axis 152. Specifically, if the user 126 adjusts the user input apparatus 122 from a neutral position 150, the flight path of the aircraft 102 can be rotated in a first direction 160 or a second direction 162 about the roll axis 152. The flight path of the aircraft 102 can also be rotated in a third direction 164 about the pitch axis 154 or a fourth direction 166 about the pitch axis 154. Furthermore, the flight path of the aircraft 102 can also be rotated about a combination of the roll axis

152 and the pitch axis 154 (e.g., change to a bank angle of the aircraft). As shown in FIG. 3b, the aircraft 102 is flying along a flight path and is rotated in the second direction 162 about the roll axis 152. That is, the change in the position of the user input apparatus 122 and thus the commanded and attained attitude, corresponds with the change in the roll angle of the aircraft 102. When the aircraft 102 is flying in the first mode, and when the ordered commanded attitude, corresponding to the change of the position of the user input apparatus 122, is equal to a predetermined threshold, such as a predetermined threshold 156, the haptic feedback device will generate haptic feedback motion of the user input apparatus 122, indicating to the user 126 that the predetermined threshold 156 has been reached. For example, the flight control system 100 may be configured to generate haptic feedback motion when the change in the commanded attitude is equal to a roll angle of thirty degrees relative to the horizon. Accordingly, when the change in the position of the user input apparatus corresponds to an ordered commanded attitude of the roll angle of thirty degrees the haptic feedback motion will be generated in real-time. Additionally, visual indications of the commanded attitude and current attained attitude may also be displayed on the visual display that is viewably by the user 126.

The feedback controller 132, in some examples, is configured to selectively generate a plurality of feedback-control signals 134. As shown in FIG. 4, the aircraft 102, flying in the first mode and rotated in the second direction 162 about the roll axis 152, has a feedback controller that is configured to generate multiple feedback-control signals 134. Each one of the plurality of feedback-control signals 134 corresponds with one of a plurality of predetermined thresholds. That is, when the position of the user input apparatus, and thus the commanded attitude, is equal to one of the plurality of predetermined thresholds, such as predetermined thresholds 158-1, 158-2, 158-3, 158-4, 158-5, and 158-6, the corresponding one of the feedback-control signals is generated. In some examples, the plurality of predetermined thresholds are positioned at regular intervals, such that the change in the position of the user input apparatus 122 between each one of the plurality of predetermined thresholds is equal. For example, as shown in FIG. 4, the flight control system 100 may be configured to generate haptic feedback motion each time the change in the commanded attitude is equal to a change in a roll angle of five degrees relative to the horizon. In other words, each time the change in the position of the user input apparatus corresponds to an ordered command attitude change of five degrees the haptic feedback motion will be generated in real-time. Accordingly, as a command attitude change of thirty degrees is ordered, multiple feedback-control signals will be generated, and in response, haptic feedback motion will be generated at each predetermined threshold 158-1, 158-2, 158-3, 158-4, 158-5, and 158-6 of five degrees. It will be appreciated that the predetermined thresholds could be any set value and these values are provided merely as examples. In other examples, the plurality of predetermined thresholds are positioned at non-regular intervals.

At least one of a duration, a frequency, or an intensity of the haptic feedback motion can have a variable magnitude. In some examples, at least one of the haptic feedback motions generated at one of the plurality of predetermined thresholds has a duration, a frequency, or an intensity that is different from others of the plurality of predetermined thresholds. For examples, the intensity of the haptic feedback motion may increase at each predetermined threshold, such that the intensity of the haptic feedback motion of the predetermined threshold 158-3 is greater than the intensity of the haptic feedback motion of the predetermined threshold 158-2, both of which may be greater than the intensity of the haptic feedback motion of the predetermined threshold 158-1, etc.

In some examples, the haptic feedback motion may have a short duration, such that it is generated in the user input apparatus 122 at the predetermined threshold and ceased thereafter. Alternatively, in other examples, the haptic feedback motion is generated in the user input apparatus 122 at the predetermined threshold and the haptic feedback motion continues until the user input apparatus 122 has a change in the position that is less than the predetermined threshold. In this case, the intensity of the haptic feedback motion can be different based on the difference between a sensed position of the user input apparatus 122 and the predetermined threshold. For example, the intensity may increase as the sensed position is further from the predetermined threshold.

As shown in FIG. 5, the aircraft 102 is in flight along a flight path and is rotated in the third direction 164 about the pitch axis 154. That is, the change in the position of the user input apparatus 122 and thus the commanded and attained attitude, corresponds with the change in the pitch angle of the aircraft 102. When the aircraft 102 is flying in the first mode, and when the ordered commanded attitude, corresponding to the change of the position of the user input apparatus 122, is equal to a predetermined threshold, such as a predetermined threshold 159, the haptic feedback device will generate haptic feedback motion of the user input apparatus 122, indicating to the user 126 that the predetermined threshold 159 has been reached. For example, the flight control system 100 may be configured to generate haptic feedback motion when the change in the commanded attitude is equal to a pitch angle of thirty degrees relative to the horizon. Accordingly, when the change in the position of the user input apparatus corresponds to an ordered commanded attitude of the pitch angle of thirty degrees the haptic feedback motion will be generated in real-time.

In any of the implementations shown in FIGS. 3-5, if the aircraft 102 is operating according to the second mode, the feedback-control signal 134 will not be generated, including when a predetermined threshold is met. In other words, no haptic feedback motion will be generated.

Referring to FIG. 6, according to some examples, a method 300 of controlling flight of an aircraft 102 is shown. The method 300 includes (block 302) measuring a flight change input from a user via a manual manipulation of a position of a user input apparatus. The method 300 also includes (block 304) determining a change in the position of the user input apparatus, due to the manual manipulation of the position of the user input apparatus, and generating position data, including the change in the position of the user input apparatus. The method 300 further includes (block 306) selectively transmitting the position data to a feedback controller. In some examples, the method can selectively switch control of the flight of the aircraft between a first mode and a second mode. When the control of the flight of the aircraft is in the first mode, the position data is transmitted to the feedback controller and further transmitted to the flight controller. When the control of the flight of the aircraft is in the second mode, the position data is transmitted to a flight controller, which generates flight control surface signals in response to the position data, such that the feedback controller is bypassed. The method 300 additionally includes (block 308) generating, via the feedback controller, a feedback-control signal when a commanded attitude, corresponding to the change in the position of the user input apparatus is determined to be equal to a predetermined threshold. The method 300 also includes (block 310) receiving the feedback-control signal by a haptic feedback device coupled to the user input apparatus. In response to the receipt of the feedback-control signal, the haptic feedback device generates haptic feedback motion of the user input apparatus. In some examples, the method includes at least two or more user input apparatuses. Accordingly, the haptic feedback motion is generated in each of the user input apparatuses.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission.

Many of the functional units described in this specification have been labeled as modules or controllers, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the examples herein are to be embraced within their scope.

What is claimed is:

1. A flight control system, comprising:

a user input apparatus configured to receive a flight change input from a user via a manual manipulation of a position of the user input apparatus;

a sensor coupled to the user input apparatus and configured to determine a change in the position of the user input apparatus, due to the manual manipulation of the position of the user input apparatus, and generate position data, including the change in the position of the user input apparatus;

a feedback controller configured to selectively receive the position data and further configured to generate a feedback-control signal when a commanded attitude, determined from the position data, is equal to a predetermined threshold, wherein the predetermined threshold is a set attitude value; and a haptic feedback device coupled to the user input apparatus, configured to receive the feedback-control signal, and, in response to receiving the feedback-control signal, generate haptic feedback motion of the user input apparatus.

2. The flight control system of claim 1, wherein:

the haptic feedback device is a vibration-inducing device; and the haptic feedback motion comprises a vibration, wherein a duration and an intensity of the vibration is such that the haptic feedback motion does not create a change in the position of the user input apparatus.

3. The flight control system of claim 1, wherein the change in the position of the user input apparatus corresponds with a change in at least one of:

a bank angle of an aircraft;

a pitch angle of the aircraft;

a roll angle of the aircraft;

a flight path angle of the aircraft;

an airspeed of the aircraft;

a heading of the aircraft;

a vertical reference path of the aircraft; or a horizontal reference path of the aircraft.

4. The flight control system of claim 1, wherein the user input apparatus comprises at least one aircraft control sidestick.

5. The flight control system of claim 1, wherein the haptic feedback motion is generated in real-time, such that the haptic feedback motion is generated by the haptic feedback device immediately after the feedback-control signal is received from the feedback controller.

6. The flight control system of claim 1, further comprising:

a flight controller configured to generate flight control surface signals in response to the position data;

wherein:

the flight control system is selectively switchable between operation in a first mode and operation in a second mode;

when the flight control system is operating in the first mode, the position data is received by the feedback controller, and wherein the position data is further transmitted to the flight controller; and when the flight control system is operating in the second mode, the position data is received directly by the flight controller, such that the feedback controller is bypassed.

7. The flight control system of claim 6, wherein when the flight control system is operating in the second mode, the feedback-control signal is not generated.

8. The flight control system of claim 1, wherein:

the flight control system comprises two or more user input apparatuses; and the haptic feedback motion is received in each one of the two or more user input apparatuses.

9. The flight control system of claim 1, further comprising:

a second user input apparatus configured to receive a second flight change input from a second user via a manual manipulation of a position of the second user input apparatus;

a second sensor coupled to the second user input apparatus and configured to determine the change in the position of the second user input apparatus, due to the manual manipulation of the position of the second user input apparatus, and generate second position data, including the change in the position of the second user input apparatus;

the feedback controller configured to selectively receive the second position data and further configured to generate a second feedback-controller signal when a second commanded attitude, determined from the second position data is equal to a second predetermined threshold, wherein the second predetermined threshold is a second set attitude value; and a second haptic feedback device coupled to the second user input apparatus, configured to receive the second feedback-controller signal and, in response to the receiving the second feedback-controller signal, generate second haptic feedback motion of the second user input apparatus.

10. The flight control system of claim 9, wherein:

the feedback controller is further configured to determine an average change of the position of the user input apparatus and the position of the second user input apparatus; and the feedback controller generates the feedback-controller signal and the second feedback-controller signal when the average change of the position of the user input apparatus and the position of the second user input apparatus is equal to the predetermined threshold.

11. The flight control system of claim 1, wherein:

the feedback controller is configured to selectively generate a plurality of feedback-control signals;

each one of the plurality of feedback-control signals corresponds with one of a plurality of predetermined thresholds; and the feedback controller generates one of the plurality of feedback-control signals when the change in the position of the user input apparatus is equal to the corresponding predetermined threshold.

12. The flight control system of claim 11, wherein the plurality of predetermined thresholds are positioned at regular intervals, such that the change in the position of the user input apparatus between each one of the plurality of predetermined thresholds is equal.

13. The flight control system of claim 1, wherein:

at least one of a duration or an intensity of the haptic feedback motion has a variable magnitude; and the at least one of the duration or the intensity of the haptic feedback motion is different based on a difference between a sensed position of the user input apparatus and the predetermined threshold.

14. A controller apparatus for controlling flight of an aircraft, the controller apparatus comprising:

a processor; and non-transitory computer readable storage media storing code, the code being executable by the processor to perform operations comprising:

determining a change in a position of a user input apparatus, due to a manual manipulation of the position of the user input apparatus and generating position data, including the change in the position of the user input apparatus;

selectively transmitting the position data to a feedback controller and a flight controller;

generating a feedback-control signal, via the feedback controller, in response to receiving the position data, when a commanded attitude, determined from the position data, is equal to a predetermined threshold, wherein the predetermined threshold is a set attitude value, and transmitting the feedback-control signal to a feedback device coupled to the user input apparatus; and generating flight control surface signals, via the flight controller, in response to receiving the position data;

wherein in response to receiving the feedback-control signal, the feedback device generates a haptic feedback motion of the user input apparatus.

15. The controller apparatus of claim 14, further comprising selectively switching control of the flight of the aircraft between a first mode and a second mode, wherein:

when control of the flight of the aircraft is in the first mode, transmitting the position data to the feedback controller and further transmitting the position data to the flight controller; and when control of the flight of the aircraft is in the second mode, transmitting the position data directly to the flight controller, such that the feedback controller is bypassed.

16. The controller apparatus of claim 15, wherein when control of the flight of the aircraft is in the second mode, the feedback-control signal is not generated.

17. The controller apparatus of claim 14, wherein:

the feedback controller is configured to generate a plurality of feedback-control signals;

each one of the plurality of feedback-control signals corresponds with one of a plurality of predetermined thresholds; and the feedback controller generates one of the plurality of feedback-control signals when the change in the position of the user input apparatus is equal to or greater than the corresponding predetermined threshold.

18. A method of controlling flight of an aircraft, the method comprising:

measuring a flight change input from a user via a manual manipulation of a position of a user input apparatus;

determining a change in the position of the user input apparatus, due to the manual manipulation of the position of the user input apparatus, and generating position data, including the change in the position of the user input apparatus;

selectively transmitting the position data to a feedback controller;

generating, via the feedback controller, a feedback-control signal in response to receiving the position data, when a commanded attitude, determined from the position data, is determined to be equal to a predetermined threshold, wherein the predetermined threshold is a set attitude value; and receiving the feedback-control signal by a haptic feedback device coupled to the user input apparatus and, in response to receiving the feedback-control signal, generating haptic feedback motion of the user input apparatus.

19. The method of claim 18, further comprising selectively switching control of the flight of the aircraft between a first mode and a second mode, wherein:

when control of the flight of the aircraft is in the first mode, transmitting the position data to the feedback controller; and when control of the flight of the aircraft is in the second mode, transmitting the position data to a flight controller, the flight controller generating flight control surface signals in response to the position data, such that the feedback controller is bypassed.

20. The method of claim 18, wherein:

the user input apparatus comprises two or more user input apparatuses; and the step of generating the haptic feedback motion of the user input apparatus comprises generating the haptic feedback motion in each one of the two or more user input apparatuses.

\*   \*   \*   \*   \*